United States Patent [19]

Long

[11] Patent Number: 5,296,932
[45] Date of Patent: Mar. 22, 1994

[54] NON-PROGRAM SIGNAL ACQUISITION SYSTEM FOR A TELEVISION SIGNAL RECEIVER

[75] Inventor: Michael E. Long, Oakbrook, Ill.

[73] Assignee: Zenith Electronics Corporation, Glenview, Ill.

[21] Appl. No.: 957,542

[22] Filed: Oct. 6, 1992

[51] Int. Cl.⁵ .................................... H04N 5/445
[52] U.S. Cl. .................................... 348/731; 348/730; 348/476
[58] Field of Search .................. 358/191.1, 181, 188, 358/190, 147, 194.1, 86; 455/6.1, 6.2; H04N 5/445

[56] References Cited

U.S. PATENT DOCUMENTS

| | | | |
|---|---|---|---|
| 4,682,234 | 7/1987 | Naimpally | 358/22 PIP |
| 4,941,048 | 7/1990 | Hartson et al. | 358/181 |
| 4,985,772 | 1/1991 | Long et al. | 358/181 |
| 5,125,106 | 6/1992 | Kato | 358/191.1 |

FOREIGN PATENT DOCUMENTS 4-086076  3/1992  Japan ................ H04N 5/445

*Primary Examiner*—James J. Groody
*Assistant Examiner*—Jeffrey S. Murrell
*Attorney, Agent, or Firm*—Roland W. Norris

[57] ABSTRACT

A television signal receiving apparatus with a channel tuner, such as a television, VCR, or cable box has circuitry for extracting nonprogram type information such as may be carried in the vertical blanking interval of a broadcast signal. In order to ensure a reliable signal source for the nonprogram type information the apparatus has a controller for setting the channel tuner to the proper channel and selecting the proper signal source to receive the nonprogram type information when the apparatus is not used for receiving regular programming signals selected by the viewer.

7 Claims, 1 Drawing Sheet

NON-PROGRAM SIGNAL ACQUISITION SYSTEM FOR A TELEVISION SIGNAL RECEIVER

BACKGROUND OF THE INVENTION

1. Field of the Invention

This invention relates to a system for automatically acquiring non-program information for storage and display by a televisions receiver. More particularly, the present invention relates to a system for automatic switching between alternative signal inputs and the acquisition of a reliable signal source so that the non-program information is always available to the user of the television receiver.

2. Discussion of Related Art

A broadcast television signal is capable of carrying information which is not directly related to the television program meant to be seen by the television viewer. Such information might be program schedule information as provided by a system such as "INSIGHT" (Trademark), a product INSIGHT TELECAST, INC., Fremont, Calif. The INSIGHT system is the subject of U.S. Pat. Nos. 4,706,122 and 4,977,445 to Young. Reference may be had to these patents for further exposition of that subject matter.

Briefly, the INSIGHT system allows user selection of programs from schedule information transmitted to, stored in, and selectively displayed by the television receiver. The INSIGHT system, or other such program schedule information services, may provide updated program schedule information for several future days by broadcasting the program schedules in digital code, whence it is stored in the television receiving set for selective display and control of television programming by the viewer. It will be understood that other information may be similarly broadcast and utilized. This information, or data, will be generically referred to as non-program information.

The non-program information is envisioned to be broadcast by placing the information in the vertical blanking interval (VBI) of a wireless broadcast channel signal. This mode of delivery for the non-program information is envisioned because, barring extensive additional circuitry to the common television receiver and/or development of alternative broadcast media for the nonprogram information, this is the surest way to implement such a system.

But, problems arise when one takes into account that approximately 60% of all American homes rely on cable or wired signal transmission as their principle source for receiving television signals. A cable television company retransmitting the wireless broadcast may be reluctant to pass through non-program information transmitted in the VBI, in which case the television set of the cable viewer will not receive the nonprogram information transmitted in the wireless broadcast.

Another problem is that while a cable company may leave the non-program information signal in its retransmission, the cable decoder box used by cable television viewers who do not have "cable ready" sets, or who need the box to decrypt encrypted programs, transmits a signal only on channel 3 or 4 from the decoder box into the television set. Thus, the tuner on these viewers' sets will always be on channel 3 or 4. But, if the non-program information is broadcast on, e.g.. channel 11, the set will not be able to capture the non-program information, and it will be unavailable to the viewer.

Thus, a system is needed for automatically switching between a problematic cable signal and an alternative signal source which reliably provides the non-program information. It is an object of the present invention to provide a system for accomplishing this.

BRIEF DESCRIPTION OF THE DRAWINGS

A more complete understanding of the objects and advantages of the present invention will be apparent upon reading the following detailed description in conjunction with the drawings.

Figure one is a block diagram of a system for obtaining a reliable wireless broadcast signal carrying the non-program information.

Figure two an alternative embodiment utilizing only a wired, or cable input.

The block diagrams depicted and described cover only the components of interest to the present invention and exclude details of signal processing and other circuitry which are known in the art.

DESCRIPTION OF THE PREFERRED EMBODIMENT

Figure 1:
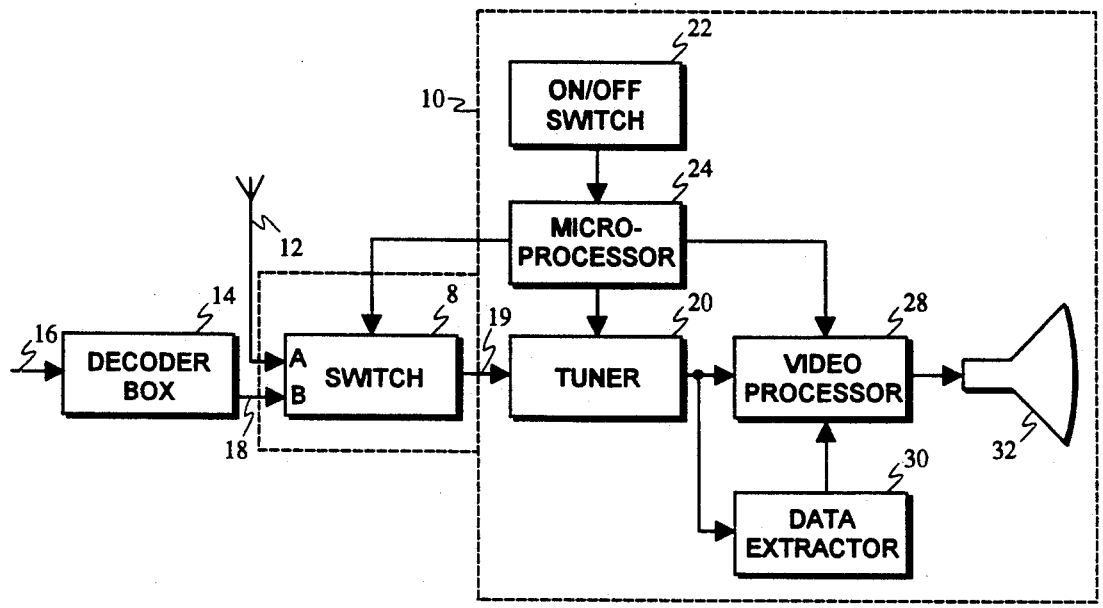

Referring to FIG. 1, there is seen an automatic A/B switch 8 for routing signals from different sources to the TV receiver 10 or other television signal receiving apparatus, e.g.. a video cassette recorder (VCR) or a cable decoder box. A/B switch 8 may comprise a separate component, or it may be built into the associated television receiver 10, the relevant components of which are indicated by the dashed line(s).

The A/B switch 8 has two inputs, A and B, and single output 19 connected to a television tuner 20. Terminal A of switch 8 is connected to an antenna 12 through which wireless broadcast signals can be received. Antenna 12 can be a set-top, roof-top, or other conventional external antenna, but may also be a small antenna internal to the receiver. The received signal is not a television picture to be viewed by the user, but is a repeating non-program signal, the satisfactory reception of which does not require a conventional high gain television antenna. Terminal B is connected directly to a cable decoder box 14. The decoder box 14 receives broadcast signals from a cable television distribution system by direct connection to a shielded cable 16 or other wiring. Encrypted signals such as premium programming may be decrypted by the decoder box 14, even if the television receiver 10 has a "cable ready" tuner.

The output 18 of the decoder box 14 is routed through terminal B of the switch 8 to the tuner 20 of the television receiver 10. The decoder box output 18 is carried on a single channel which in the U.S.A. is either VHF channel 3 or VHF channel 4, referred to hereinafter as channel 3/4.

The television receiver 10 is comprised of an ON/OFF switch 22, a microprocessor 24, a tuner 20, a video processor 28, and a non-program information data extractor 30. The medium for displaying the television image is preferably, but not necessarily, a cathode ray tube (CRT) 32. The data extractor 30 receives and extracts the nonprogram information, or data, from the VBI of a carrier signal and stores it for later display through the video processor 28 and CRT 32 when a nonprogram information display function is selected by the user of the television receiver 10.

When the ON/OFF switch is placed in the ON position, this is detected by the microprocessor 24. The microprocessor 24 signals the A/B switch 8 to select terminal B as the active terminal, allowing the tuner 20 to receive the decoder box output 18. As previously discussed, the decoder box allows cable channel selection but its output is only on channel 3/4 and therefore the tuner 20 will likewise be set to channel 3/4. Thus, the data extractor 30 will be unable to obtain any nonprogram information carried on channels other than 3/4.

If the tuner is cable ready and shielded cable 16 inputs the cable broadcast directly to the tuner 20, the possibility still remains that the cable company will have stripped the nonprogram information from its retransmission, thus mooting the data extractor 30 function.

Therefore, in order to automatically secure the nonprogram information from a reliable source, such as a wireless transmitter who has contracted to broadcast the nonprogram information in the VBI, the following is caused to happen in accordance with the present invention. When the ON/OFF switch 22 is placed in the OFF position, the CRT 32 and its video processor 28 shut off, but the microprocessor 24, tuner 20, data extractor 30 and A/B switch 8 remain on. The microprocessor 24 detects the off position on the ON/OFF switch 22, or alternatively, the video processor activity, and signals the A/B seithc 8 to select the A terminal as the active terminal. The microprocessor 24 also signals the tuner 20 to select that predetermined channel on which the nonprogram information is being broadcast (channel 11 in the above example). Thus, the wireless broadcast of the nonprogram information is received through the antenna 12 and passed through the A terminal to the active tuner 20, which passes the signal to the data extractor 30, where the nonprogram information is stored for later retrieval and display through the video processor 28 and CRT 32 when the television is turned on and the nonprogram information display function is selected by the viewer.

Figure 2:
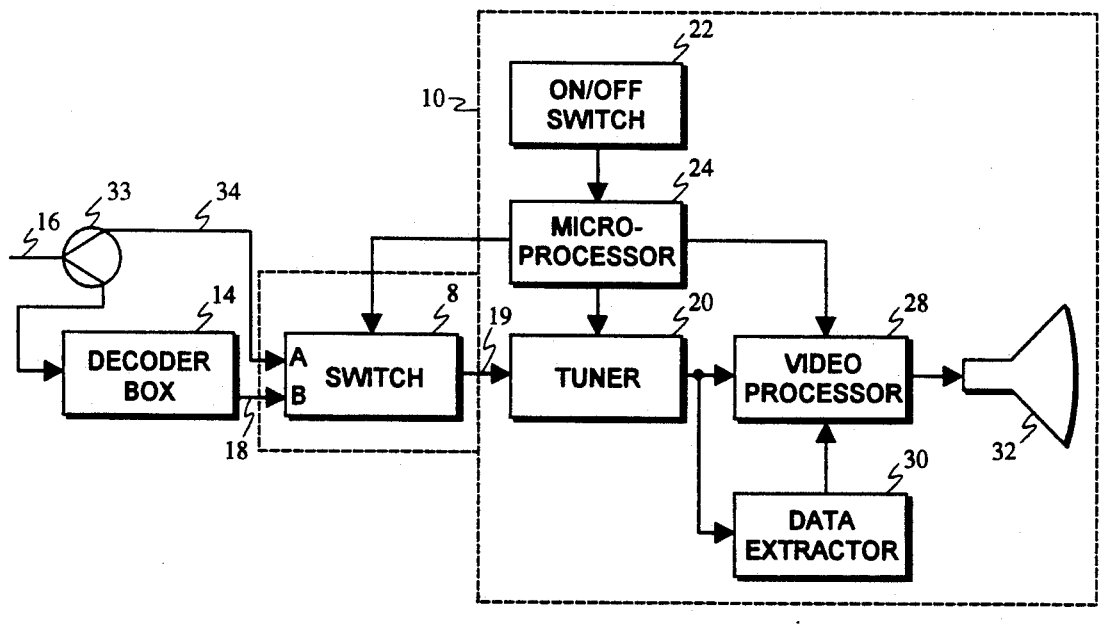

While the present invention has been illustrated and described in connection with the preferred embodiments, it is not to be limited to the particular structure shown, because many variations thereof will be evident to one skilled in the art and are intended to be encompassed in the present invention as set forth in the following claims. One such variation is shown in FIG. 2. In this embodiment, the cable system is known to have maintained the nonprogram data within its transmission and the data is therefore readily available on the cable input 16. However, the decoder box 14 still blocks access to the nonprogram data from reception by the TV receiver 10. In the embodiment shown in FIG. 2, the A input of the A/B switch is simply connected to a second terminal 34 of an RF two way splitter 33 allowing access by the TV tuner 20 to the full cable spectrum by-passed around the decoder box 14.

Having thus described the invention,
What is claimed is:

1. In a television receiver apparatus having video processor circuitry for controlling a display medium to produce a display, multiple broadcast signal input sources, and a tuner for selecting broadcast channels from among the multiple input sources for application to the video processor, the improvement comprising:
   a) means for detecting whether the video processor circuitry is active or inactive;
   b) means for selecting a predetermined input signal source if the video processor circuitry is inactive;
   c) means for selecting a predetermined tuner channel setting if the video processor circuitry is inactive.

2. In the television receiver apparatus of claim 1 the improvement further comprising;
   means for activating and inactivating the video processor circuitry.

3. In the television receiver apparatus of claim 2, the further improvement wherein the means for detecting is responsive to the means for activating and inactivating the videoprocessor circuitry.

4. A television signal receiver comprising,
   a) an ON/OFF switch,
   b) a microprocessor for detecting the position of the ON/OFF switch,
   c) a tuner controllable by the microprocessor to select a broadcast channel carrying nonprogram information when the ON/OFF switch is in the OFF position,
   d) an input source switch having first and second input terminals and an output, the output connected to the tunner,
   the input source switch being controllable by the microprocessor to select the first input to pass to the output when the ON-OFF switch is in the OFF position, and to select the second input to pass to the output when the ON/OFF switch is in the ON position,
   whereby a reliable broadcast source of nonprogram information is automatically available to the television signal receiver when the receiver is turned off.

5. The television signal receiver of claim 4 further comprising: a data extractor for gathering nonprogram information carried on the broadcast channel selected by the tuner.

6. The television signal receiver of claim 5 further comprising:
   a) a display medium, and
   b) video processor circuitry for controlling the display medium to produce a display, the video processor circuitry and display medium being responsive to the position of the ON/OFF switch.

7. The television signal receiver of claim 4 further comprising:
   a) a display medium, and
   b) video processor circuitry for controlling the display medium to produce a display, the video processor circuitry and display medium being responsive to the position of the ON/OFF switch.

* * * * *